Oct. 19, 1965   N. W. ROSENBERG ETAL   3,212,441
ARTIFICIAL GLOW IN THE UPPER-ATMOSPHERE
Filed March 31, 1964   3 Sheets-Sheet 3

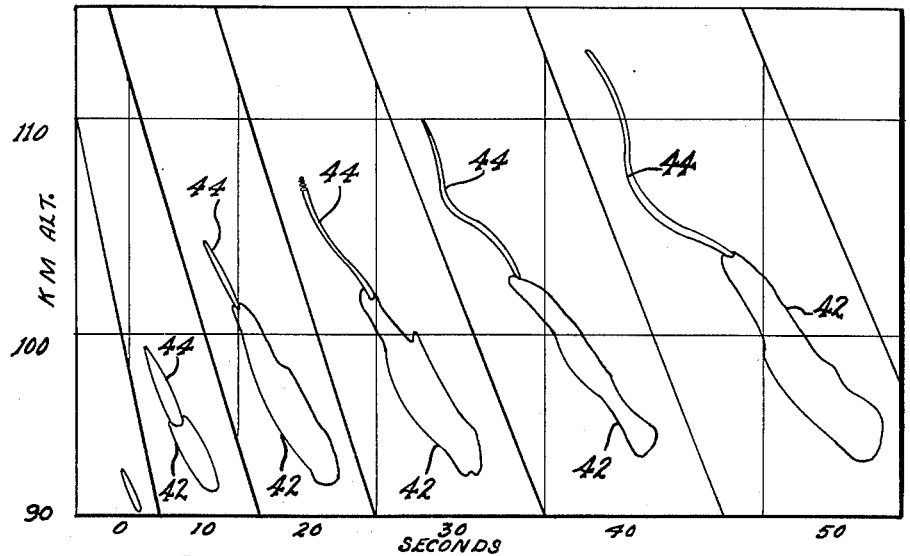
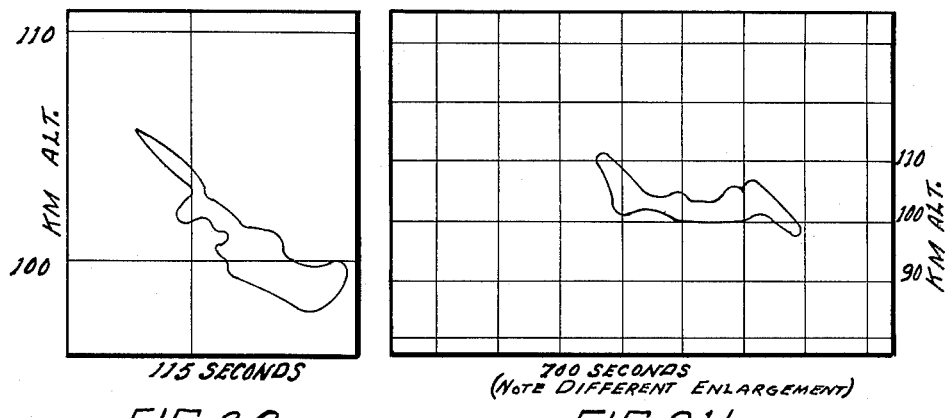

INVENTOR.
NORMAN W. ROSENBERG,
DAN J. GOLOMB
BY
ATTORNEYS

United States Patent Office 3,212,441
Patented Oct. 19, 1965

3,212,441
ARTIFICIAL GLOW IN THE UPPER-ATMOSPHERE
Norman W. Rosenberg and Dan S. Golomb, Newton, Mass., assignors to the United States of America as represented by the Secretary of the Air Force
Filed Mar. 31, 1964, Ser. No. 356,329
6 Claims. (Cl. 102—87)
(Granted under Title 35, U.S. Code (1952), sec. 266)

The invention described herein may be manufactured and used by or for the United States Government for governmental purposes without payment to us of any royalty thereon.

This invention relates to a method for forming persistent self-luminous trails in the upper-atmosphere. More particularly, this invention relates to a method for producing a high quantum yield glow by dispersing an organo-metallic compound into the upper-reaches of the atmosphere at heights in excess of 85 kilometers.

The invention provides for the emission of a trail of light within the visible, infrared and ultroviolet parts of the spectrum. The trail of light is readily visible from the ground through the use of conventional optical instruments, or the naked eye, and enables an observer to follow the motion of the dispersed material. By using triangulation and other conventional detection techniques, the movement of the glow mechanism can be utilized in measuring upper-atmospheric air currents such as wind shear, wind turbulence and diffusion. The brilliance of the glow mechanism also finds utility as a means for determining the concentration of upper-atmospheric constituents at the release altitude such as oxygen atom concentration, since the degree of brilliance, when compared with a known amount of dispersed material, can be correlated to the oxygen atom concentration. Additionally, the trail of light can be employed as a means for tracing the trajectory and determining the position of space vehicles and satellites during the hours of either daylight or darkness.

Many methods have been relied upon in the past in an attempt to produce persistent self-luminous trails in the chemosphere or upper-atmosphere. One method, for example, concerned itself with the release from a rocket of the reaction products of a cesium nitrate-aluminum burner, while another method involved the release of nitric oxide. However, the upper-atmospheric glow produced by these prior methods did not possess the high degree of luminescence and permanence necessary to obtain accurate ground measurement. With the present invention, however, it has been found that a self-luminous trail can be formed in the upper atmosphere at heights in excess of 85 kilometers. The artificial glow mechanism produced by this invention persists in the chemosphere for longer periods of time over greater areas and with a higher magnitude of brilliance than was ever achieved by previous known methods.

Accordingly, it is the primary object of this invention to provide a method for forming a self-luminous trail in the upper-atmosphere at heights in excess of 85 kilometers.

Another object of this invention is to provide for the formation of a chemiluminescent glow mechanism in the upper-atmosphere that is easily detected by ground observation.

Still another object of this invention is the formation of a large, brilliant and self-luminous trail that persists in the upper-atmosphere over a period of time sufficient to provide for the accurate measure of its size and movement by means of conventional optical instruments.

The above and still further objects and advantages of this invention will become more readily apparent upon consideration of the following detailed description when taken in connection with the following drawings, wherein:

FIGURE 1 is a cross-sectional view of a rocket-borne payload assembly suitable for use in dispersing the glow-producing compounds of this invention;

FIGURES 2A to 2H inclusive, represent an illustration of a photographic montage which compares the change in size at various times after launch of two self-luminous trails produced by the release of trimethyl aluminum and a cesium nitrate-aluminum burner at an altitude of about 94 kilometers;

Figure 1:
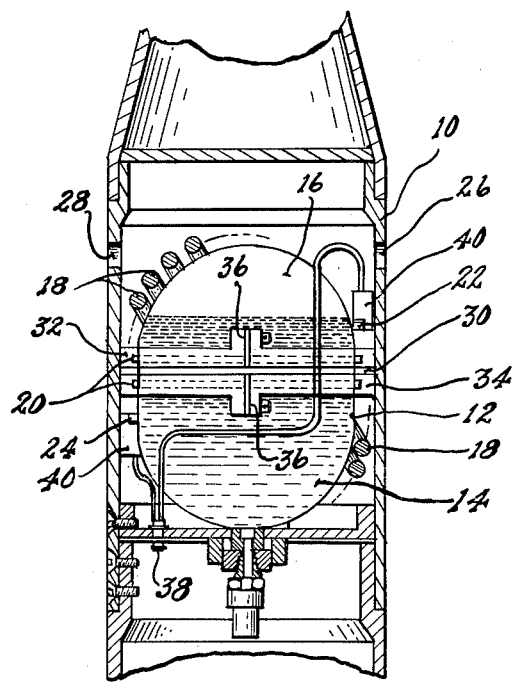

In general, this invention concerns itself with the formation of an artificial glow mechanism, or self-luminous trail, in the upper-reaches of the atmosphere through the dispersion of an organo-metallic compound by means of a sounding rocket or other type space craft.

A payload assembly, containing the organo-metallic compound, is borne aloft by the rocket and, upon initiation, the compound is dispersed in the vaporous state into the atmosphere. The dispersed vapors produce a high quantum glow upon release in the oxygen atom rich regions of the upper-atmosphere, or chemosphere, as a result of a reaction between the compound and the oxygen atoms.

It is theorized that the following reaction mechanism ocurs. between the released material and the atmospheric oxygen.

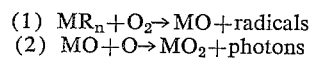

wherein: M is a metal selected from the group consisting of aluminum, zinc, lead, bismuth, tin and mercury; R is a monovalent lower alkyl radical; and $n$ is an integer from 1 to 4. The reaction mechanism is a postulate only; however, it does appear that the high quantum glow mechanism produced by the release of an organo-metallic compound into the atmosphere can be attributed to such a reaction.

Trimethyl aluminum has been found to be preferable as a dispersion material. It is readily available and possesses a relatively high vapor pressure at room temperature, thereby insuring a high fractional vaporization at the release altitude. Other organo-metallic compounds which have been found suitable for dispersion in the atmosphere are the monovalent lower alkyl derivatives of lead, zinc, bismuth, tin and mercury, such as, for example, dimethyl zinc, tetramethyl lead, triethyl bismuth, tetramethyl tin, dimethyl mercury and triisopropyl aluminum.

The glow mechanism produced by these compounds is not satisfactorily effected at altitudes below about 85 kilometers. However, a satisfactory glow mechanism is formed at heights in excess of about 85 kilometers and has been effected at heights as great as approximately 180 kilometers. It would appear that a desirable glow mechanism could be produced at even greater heights provided there is sufficient oxygen to effectuate a reaction between the glow producing compound and the oxygen atoms.

The organo-metallic compound is dispersed as a vapor into the atmosphere by means of a suitable pressurized container which is borne aloft by means of a rocket. As the vaporous material is dispersed, a glow mechanism, or self-luminous trail, is formed along the trajectory taken by the rocket. Generally, the dispersion compound is heated prior to release in order to insure adequate vaporization before freezing occurs as a result of the extremely low temperatures encountered at the release altitude. However, as an additional embodiment of this invention, it has been found that an inert diluent can be added to the organo-metallic compound in amounts of from about 10 to 20 percent by weight of the total. The diluent increases the vaporization efficiency of the organo-metallic compound by lowering its freezing point. This provides for a greater degree of fractional vaporization before freezing occurs at the low temperatures generated by the dispersed vapors. Triethyl aluminum has been found to be an excellent diluent for increasing the vaporization efficiency of trimethyl aluminum. The use of the diluent increases the fraction which vaporizes in the short time available before freezing takes place. Utilization of the diluent tends to eliminate the need for heating the compound and the complex problems of monitoring, controlling, and activation generally associated with the step of heating.

Dispersion of the organo-metallic compound by means of a rocket results in the formation of a self-luminous trail along the length of the trajectory taken by the rocket borne payload assembly. A minimum of 1 kilogram of material dispersed along the trajectory of the rocket over a length of 100 kilometers has been found adequate for forming a self-luminous trail which is sufficiently persistent and bright for accurate ground observation by conventional cameras.

Referring now in more detail to the drawings, there is shown in FIGURE 1 a hollow cylindrical body which can be employed as a rocket-borne payload assembly for dispersing the organo-metallic compounds of this invention. The cylindrical body consists of an outer sleeve 10 forming a payload skin. An inner cylindrical vessel 12, with a hollow portion of about 1800 cubic centimeters volume, is located within the outer sleeve 10 and contains approximately 1100 grams of trimethyl aluminum 14. A void space 16 within the inner vessel 12 is pressurized with nitrogen to 25 atmospheres. A heating means 18, such as a conventional heating coil or heating tape, is positioned around the outer periphery of the inner vessel 12 to permit heating of its periphery of the inner vessel 12 to permit heating of its contents to about 70° C. before launch. It has been calculated that during flash vaporization at this temperature about 40 percent of the trimethyl aluminum would vaporize and the remainder would freeze.

A shaped charge 20 is mounted around the inner vessel 12 and held in place by O-ring 30, backup rings 32 and 34 and a shim backup ring 36. When the rocket attains the proper altitude, the shaped charge is activated such that the resulting explosion cuts open the vessel 12 thereby providing for the escape of its contents. An electrical connector 38 receives an impulse from a timing means (not shown) to activate squibs 22 and 24 in blasting cup retainer 40 for setting off the shaped charges 20. Portholes 26 and 28 are drilled through the outer skin of the payload assembly in order to allow for the escape and dispersion of the trimethyl aluminum 14 into the atmosphere.

The entire payload assembly was borne aloft into the atmosphere by means of a conventional rocket. Release of the vaporous trimethyl aluminum 14 was initiated at about 94 kilometers altitude and about 15 seconds was required for its escape through portholes 26 and 28 as the rocket continued its climb to an altitude of about 102 kilometers. An intensely luminous cylindrical trail of about 20 kilometers in length developed along the trajectory taken by the rocket. The resulting trail attained a maximum diameter of about 2 kilometers at 7 seconds, about 3 kilometers at 22 seconds and about 7 kilometers at 100 seconds. At about 100 kilometers altitude, the trail was visible to the naked eye and photographable for about 1000 seconds. Photography permitted triangulation from which diffusion, turbulence, shear, and other wind data could be obtained.

FIGURES 2A to 2H inclusive, disclose illustrations of the change in size of a self-luminous trail 42 produced as a result of releasing the 1100 grams of trimethyl aluminum 14 referred to above, and compares its change in size with the change in size of a trail formed by a cesium nitrate-aluminum burner release 44 carried in the same payload assembly. The comparison is made at the time of dispersion and at intervals of 10, 20, 30, 40, 50, 115 and 700 seconds respectively, after release. Observation of the changes in size was made from a point about 120 kilometers east of the release area with a K-24 camera (175 mm., f./2.5, 5-sec. exposure) using Royal-X Pan film. The elapsed time period after release is noted at the bottom of each figure and the approximate altitude is noted along the left margin thereof. The cesium nitrate-aluminum burner release 44 may be seen leaving a trail at higher altitudes, but it is much smaller and much less brilliant. FIGURE 2H represents a different enlargement, but a comparison can be made by examining the change in size at the particular height over the indicated period of time.

Figure 3:
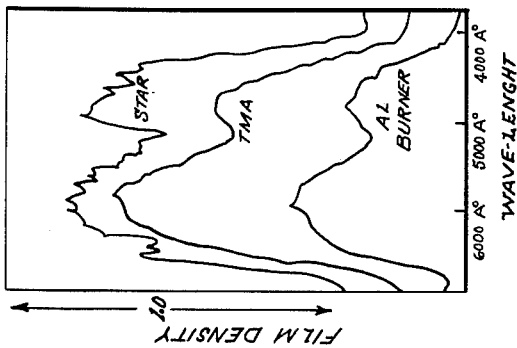
FIGURE 3 is a graph comparing the spectrums of glows from the trimethyl aluminum release and the cesium nitrate-aluminum burner release illustrated in FIGURES 2A to 2H compared with the continuum spectrum of a star.

FIGURE 3 presents a spectral analysis of the self-luminous trails of FIGURES 2A to 2H and sets forth the densitometer traces of the spectrums of the trimethyl aluminum glow, the cesium nitrate-aluminum burner glow and an unidentified star in the field of view which may be considered a continuum black body source. (The start image is noisy because of the small image size compared with the film grain size.) It is noted that the aluminum burner glow and the trimethyl aluminum glow are nearly identical continua over the film sensitivity range (4000 to 6800 A.), and have a considerably higher red content than the star image. The dip in all spectrums at 5000 A. is due to a dip in the film sensitivity. The spectrum extended well into the infrared since the image was also photographed on IR film with a Wratten 87 filter (7000 to 8500 A.).

Figure 4:
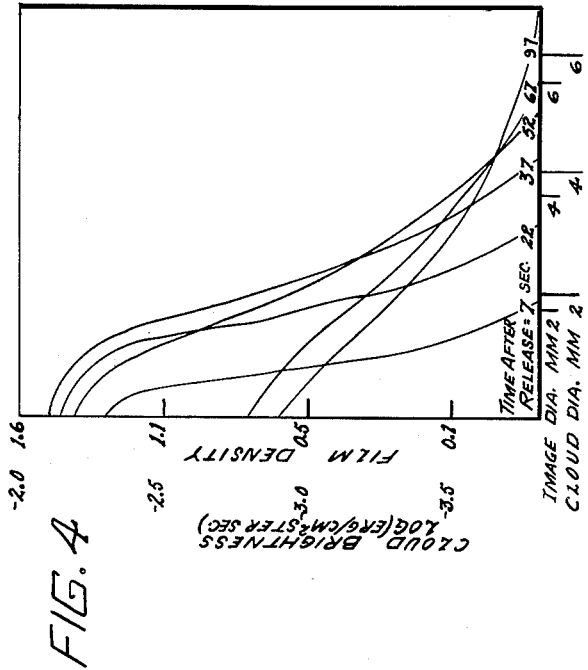
FIGURE 4 is a graph of the brightness of the trimethyl aluminum release illustrated in FIGURES 2A to 2H versus the trail diameter at various times after a launch.

The film image diameter of the K-24 images of FIGURES 2A to 2H and the growth rate were measured with a densitometer at various film densities and are plotted in FIGURE 4. From the known slant range, the actual cloud diameter was computed and the results thereof are noted in FIGURE 4. A similar diagram was prepared for image area versus time, and a calibrated sensitometric strip permitted photometric estimates to be made of image brightness, total energy flux, and photon yields from the cloud. The actual surface brightness of the cloud equivalent to each density contour is also noted in FIGURE 4.

Figure 5:
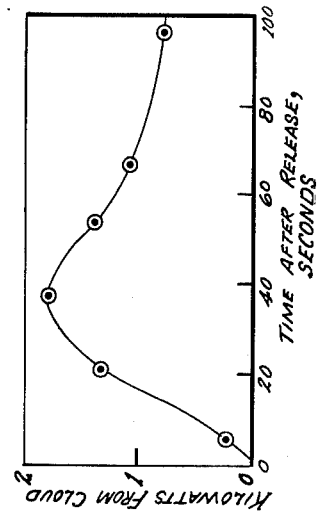
FIGURE 5 is a graph of the light emission rate from the trimethyl aluminum release illustrated in FIGURES 2A to 2H.

The energy of all wavelengths emitted by the cloud was assumed to be as effective in film darkening as the 4500 to 4600 A. radiation used to prepare the sensitometric strip. FIGURE 5 shows the radiated energy of the cloud, peaking at 2 kw. and averaging 1 kw. over the first 100 seconds. Over the total cloud life about 200 kw. sec.=$2 \times 10^{12}$ erg=$4 \times 10^{23}$ effective photons were emitted. However, because the radiation was more intense in the red and infrared where film sensitivity is less (or nil), it is estimated that 1 to $2 \times 10^{24}$ photons were actually produced.

Approximately $8 \times 10^{24}$ molecules of trimethyl aluminum were released, of which about $3 \times 10^{24}$ were available as vapor ($5 \times 10^{24}$ molecules froze). The quantum yield is thus 0.3 to 0.6 photons per vaporized trimethyl aluminum molecule. Few, if any, noncyclic reactions have such high quantum yields. The high yield of this reaction is probably related to the regeneration of the active species.

The approximate overall reaction rate may be derived from the following considerations. By referring to FIGURE 4, it can be seen that the maximum brightness of $10^{-2.1}$ erg/cm.$^2$ ster. sec. occurs at 37 seconds. At this time, the cloud brightness falls to $1/e$ of its maximum at a diameter of 1.5 km.$=10^{5.2}$ cm. The cloud is considered to be a cylinder 20 km. long and 1.5 km. in diameter, with a constant composition throughout this volume. This yields only an approximation to the actual concentration distribution, and the accuracy of the rate constant calculated below is therefore restricted to an order of magnitude. The volumetric emission must then average $10^{-7.3}$ erg/cm.$^3$ ster. sec., or in a $4\pi$ geometry $10^{-6.2}$ erg/cm.$^3$ sec., throughout the cylinder volume of $10^{10.5}$ cm.$^3$. The cylinder thus emits a total of $10^{10.3}$ ergs/sec. equal to 2 kw., in agreement with FIGURE 5. The gaseous trimethyl aluminum ($3 \times 10^{24}$ molecules) may be considered to be spread over this volume, averaging $10^{8.0}$ molecules/cm.$^3$ and reacting with a concentration of about $10^{12.5}$ oxygen atoms/cm.$^3$ (at 100 km. altitude). The total photon yield is $10^{-6.2}$ erg/cm.$^3$ sec. $\times 10^{11.3}$ photons/erg $\times 4$ total emitted photons per film-recorded photon, or $10^{5.5}$ photons/cm.$^3$ sec. If the reaction is between trimethyl aluminum and atomic oxygen, a nominal rate equation may be written as $\phi=k[O][TMA]$, where $\phi$ is the photon flux/cm.$^3$ sec. Inserting the above values yields a value for $k$ of the order of $10^{-15}$ cm.$^3$/sec., a relatively slow reaction constant.

However, regardless of the emission mechanism, the high photon yield of the organo-metallic compounds of this invention, particularly trimethyl aluminum, and the simplicity of providing a persistent, self-luminous trail in the upper atmosphere offer an excellent opportunity for synoptic measurements of ionospheric winds, shears, turbulence, and diffusion constants throughout the night.

It will be understood by those skilled in the art to which the subject matter of the present invention pertains that while the methods described herein illustrate preferred embodiments of the invention, various modifications and alterations can be made without departing from the spirit and scope thereof and that all such modifications as fall within the scope of the appended claims are intended to be included therein.

What we claim is:

1. A method for forming a self-luminous trail in the upper-atmosphere at an altitude in excess of about 85 kilometers comprising the step of dispersing into the said upper-atmosphere an organo-metallic compound having the following structural formula:

$$MR_n$$

wherein M is a metal selected from the group consisting of aluminum, zinc, lead, bismuth, tin and mercury; R is a monovalent lower alkyl radical; and $n$ is an integer from 1 to 4.

2. A method in accordance with claim 1 wherein said organo-metallic compound is trimethyl aluminum.

3. A method for forming a self-luminous trail in the upper-atmosphere comprising the steps of pressurizing a container of an organo-metallic compound having the following structural formula:

$$MR_n$$

wherein M is a metal selected from the group consisting of aluminum, zinc, lead, bismuth, tin and mercury; R is a monovalent lower alkyl radical; and $n$ is an integer from 1 to 4, and releasing said pressurized organo-metallic compound into the upper-atmosphere at an altitude in excess of about 85 kilometers.

4. A method in accordance with claim 3 wherein said organo-metallic compound is trimethyl aluminum.

5. A method for forming a self-luminous trail in the upper-atmosphere comprising the steps of adding an organo-metallic compound to a closed container, said organo-metallic compound having the following structural formula:

$$MR_n$$

wherein M is a metal selected from the group consisting of aluminum, zinc, lead, bismuth, tin and mercury; R is a monovalent lower alkyl radical; and $n$ is an integer from 1 to 4; adding an inert diluent to said closed container in order to increase the degree of fractional vaporization of the said organo-metallic compound, pressurizing said closed container, and releasing the contents of said closed container into the upper-atmosphere at an altitude in excess of about 85 kilometers.

6. A method in accordance with claim 5 wherein said organo-metallic compound is trimethyl aluminum and said inert diluent is triethyl aluminum.

References Cited by the Examiner

UNITED STATES PATENTS

| | | | |
|---|---|---|---|
| 809,988 | 1/06 | Semple | 102—87 |
| 3,042,696 | 7/62 | Aldridge | 260—448 |

OTHER REFERENCES

The Condensed Chemical Dictionary (6th ed.), Reinhold Publishing Co., 1961, p. 1170.

Luminescence of Aluminum Electrodes in the Process of A.C. Electrolytic Oxidation, T. Lewoeski, Acta Phys. Polon., vol. 23, pp. 215–220, February 1963 (see 22–182 Solid State Abstracts, vol. 4, No. 11–12, 1963).

SAMUEL FEINBERG, *Primary Examiner.*

BENJAMIN A. BORCHELT, *Examiner.*